(12) United States Patent
Diao et al.

(10) Patent No.: US 12,227,531 B2
(45) Date of Patent: Feb. 18, 2025

(54) SILYLATED ORGANOMODIFIED COMPOUNDS

(71) Applicant: MOMENTIVE PERFORMANCE MATERIALS INC., Waterford, NY (US)

(72) Inventors: Cheng Diao, White Plains, NY (US); Monjit Phukan, West Harrison, NY (US); Neal Patel, Nyack, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 17/989,131

(22) Filed: Nov. 17, 2022

(65) Prior Publication Data

US 2023/0159571 A1    May 25, 2023

Related U.S. Application Data (60) Provisional application No. 63/282,790, filed on Nov. 24, 2021.

(51) Int. Cl.
| | | |
|---|---|---|
| *C07F 7/18* | (2006.01) | |
| *C08G 18/28* | (2006.01) | |
| *C08G 77/388* | (2006.01) | |

(52) U.S. Cl.
CPC .......... *C07F 7/1804* (2013.01); *C08G 18/289* (2013.01); *C08G 77/388* (2013.01)

(58) Field of Classification Search
CPC .................. C08G 18/289; C08G 18/3848; C08G 18/718; C08G 77/388; C07F 7/1804
See application file for complete search history.

(56) References Cited

U.S. PATENT DOCUMENTS

| | | | |
|---|---|---|---|
| 2004/0065227 A1 | 4/2004 | Breton et al. | |
| 2006/0018856 A1* | 1/2006 | Bosman | A61Q 15/00 528/10 |
| 2019/0233592 A1 | 8/2019 | Yao et al. | |

FOREIGN PATENT DOCUMENTS

| | | |
|---|---|---|
| EP | 3686232 A1 | 7/2020 |
| FR | 2961100 A1 | 12/2011 |
| WO | 2011080494 A2 | 7/2011 |
| WO | 2015133357 A1 | 9/2015 |

OTHER PUBLICATIONS

Kadhirvel (Journal of Chromatography A, 1424, 2015, 59-68).*
International Search Report for International Application PCT/US2022/050200 dated Feb. 28, 2023.
Hirschberg et al, Supramolecular Polymers from Linear Telechelic Siloxanes with Quadruple-Hydrogen-Bonded Units, Scientific Article, Dec. 18, 1998, pp. 2696-2705, Macromolecules.
Zha et al, End Groups of Functionalized Siloxane Oligomers Direct Block-Copolymeric or Liquid-Crystalline Self-Assembly Behavior, Scientific Article, Mar. 1, 2016, pp. 5693-5698, Journal of the American Chemical Society.
Wipf et al, Synthesis of Chemoreversible Prodrugs of ara-C with Variable Time-Release Profiles. Biological Evaluation of Their Apoptotic Activity, Scientific Article, May 14, 1996, pp. 1585-1596, Pergamon.
Stefan Kairies et al., Novel Precursors for Inorganic-Organic Hybrid Materials, Published Jul. 26, 2005, 543-549, Wiley-VCH Verlag GmbH & Co. KGaA, Germany.

* cited by examiner

*Primary Examiner* — Pancham Bakshi
(74) *Attorney, Agent, or Firm* — James C. Abruzzo (57) ABSTRACT

There is provided herein a silylated organo-modified compound which comprises:
at least one moiety having the formula (A):

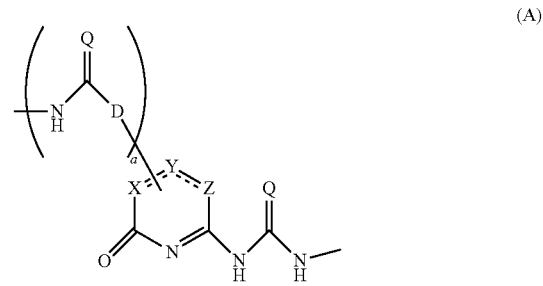

(A)

wherein the subscript a is 1 or 2, each D is independently NH or O, each of X, Y and Z are independently an unsubstituted or substituted C or N, the dashed lines between X, Y, and Z indicate an optional double bond between either X and Y or Y and Z, with the proviso that when any of X, Y, or Z is a substituted N atom, such substituted N atom does not participate in a double bond, and each Q is independently O or S; and,
at least two moieties having the formula (B):

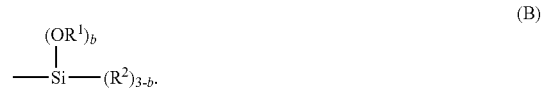

(B)

21 Claims, 2 Drawing Sheets

SILYLATED ORGANOMODIFIED COMPOUNDS

FIELD OF THE INVENTION

The present invention relates to silylated organomodified compounds. The invention further relates to a process for synthesis of silylated organomodified compounds.

DESCRIPTION OF THE RELATED ART

In applications using resins together with other materials, interfacial bonding is critical in determining a product's quality, performance, and long-term reliability. Organic polymers/resins normally have weak interfacial bonding with inorganic materials such as metal, glass and ceramic due to their different chemical natures.

Traditionally, silylated organomodified compounds have been used to increase the interfacial adhesion between the organic resin and an inorganic substrate. The silyl portion of the silane coupling agent bonds with hydroxyl groups on the inorganic substrate and the organic functional group of the silane coupling agent bonds with the organic resin.

Nevertheless, in many applications, existing silylated organomodified compounds do not provide sufficient interfacial bonding desired for industrial requirements, such as in flexible copper clad laminates.

Thus, there is a need for silylated organomodified compounds that provide sufficient interfacial bonding desired for industrial applications.

SUMMARY OF THE INVENTION

The inventors herein have surprisingly discovered a silylated organo-modified compound, which improves interfacial adhesion between various substrates. While not wishing to be bound by theory, it is believed that the silylated organo-modified compound of the present invention not only provides for bonding between the inorganic substrate moieties and the silyl moiety, but also provides for "coordinated" hydrogen bonds between the hydrogen bonding functional group, i.e., moiety (A) defined herein, and many different organic resins and substrates. The silylated organomodified compounds described herein improves interfacial adhesion between resins and substrates There is provided herein a silylated organo-modified compound which comprises: at least one moiety having the formula (A):

wherein the subscript a is 1 or 2, each D is independently NH or O, each of X, Y and Z are independently an unsubstituted or substituted C or N, the dashed lines between X, Y, and Z indicate, an optional double bond between either X and Y or Y and Z, with the proviso that when any of X, Y, or Z is a substituted N atom, such substituted N atom does not participate in a double bond; and each Q is independently O or S; and, at least two moieties having the formula (B):

wherein the subscript b is an integer of from 1 to 3, preferably 2 or 3, and each $R^1$ is independently a monovalent group selected from the group consisting of a straight chain alkyl containing from 1 to about 12 carbon atoms, preferably from 1 to about 8 carbon atoms, more preferably from 1 to about 4 carbon atoms, a straight chain alkyl containing 2 to about 12 carbon atoms and a hydroxyl group, preferably from 2 to about 10 carbon atoms and a hydroxyl group and more preferably from 2 to about 6 carbon atoms and a hydroxyl group, a branched chain alkyl containing from 4 to about 12 carbon atoms, preferably 4 to about 8 carbon atoms, a branched chain alkyl containing 4 to about 6 carbon atoms and a hydroxyl group, a cycloalkyl containing from 5 to about 18 carbon atoms, preferably from 6 to about 12 carbon atoms, more preferably from 6 to about 10 carbon atoms, an alkenyl containing from 2 to about 12 carbon atoms, preferably from 2 to about 8 carbon atoms, an aryl containing about 6 carbon atoms, an aralkyl containing from 7 to about 12 carbon atoms, an alkyl containing at least one oxygen atom having the structure:

$$-R^3-(OCH_2CH_2)_c(OCH_2CH(CH_3))_dOR^4$$

wherein the subscripts c and d are each independently 0, or 1 to about 20, and
a divalent group formed from two $R^1$ groups being bonded together through a covalent bond,
with the provisos that (i) if two $R^1$ groups are bonded together, then b is 2 or 3 and (ii) the sum of c+d is from 1 to about 20; and,
each $R^2$ is independently a monovalent group selected from the group consisting of a straight chain alkyl containing from 1 to about 12 carbon atoms, preferably from 1 to about 8 carbon atoms, more preferably from 1 to about 4 carbon atoms, a branched chain alkyl containing from 4 to about 12 carbon atoms, preferably from 4 to about 8 carbon atoms, a cycloalkyl containing from about 5 or 6 carbon atoms, an alkenyl containing from 2 to about 12 carbon atoms, preferably from 2 to about 8 carbon atoms, an aryl containing about 6 carbon atoms, and an aralkyl containing from 7 to about 12 carbon atoms;
$R^3$ is divalent group selected from the group consisting of a straight chain alkylene containing from 1 to about 10 carbon atoms, preferably from 1 to about 6 carbon atoms, more preferably from 1 to about 4 carbon atoms, a branched chain alkylene containing from 4 to about 10 carbon atoms, preferably from 4 to about 8 carbon atoms, and a cycloalkylene containing from 5 to about 10 carbon atoms; and,
$R^4$ is a monovalent group selected from the group consisting of a straight chain alkyl containing from 1 to about 18 carbon atoms, preferably from 1 to about 12 carbon atoms, more preferably from 1 to about 8 carbon atoms, and most preferably from 1 to about 4 carbon atoms, a branched chain alkyl containing from 4 to about 18 carbon atoms, preferably from 4 to about 12 carbon atoms, more preferably from 4 to about 8 carbon atoms, a cycloalkyl containing from 5 to about 18 carbon atoms, more preferably from 6 to about 12 carbon atoms, an alkenyl containing from 2 to about 18 carbon atoms, more preferably from 2 to about 12 carbon atoms, more preferably from 2 to about 8 carbon atoms, an aryl containing from about 6 to about 18 carbon atoms, preferably from about 6 to about 12 carbon atoms, an aralkyl containing from 7 to about 18 carbon atoms, more preferably from 7 to about 12 carbon atoms, and hydrogen, or $R^4$ is a divalent group selected from the group consisting of an alkylene containing from 1 to about 10 carbon atoms, preferably from 1 to about 8 carbon atoms and more preferably from 1 to about 6 carbon atoms, a cycloalkylene containing from 5 to about 10 carbon atoms, and phenylene.

DETAILED DESCRIPTION OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

The use of any and all examples, or exemplary language (e.g., "such as") provided herein, is intended merely to better illustrate the invention and does not pose a limitation on the scope of the invention unless otherwise claimed.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

No language in the specification should be construed as indicating any non-claimed element as essential to the practice of the invention.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Other than in the working examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

In one embodiment herein, it will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species, or detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The expression "silylated organo-modified compound" is used herein. synonymously with "silane coupling agent". The silylated organo-modified compound described is understood to be a material which is capable of being interactive and/or reactive with both the hydroxy groups on an inorganic substrate and the reactive moieties of a resin, e.g., reactive with the organic group(s) of an organic resin. While not wishing to be bound by theory, the moiety defined as formula (A), forms "coordinated" hydrogen bonds with a substrate. In addition, the —$OR^1$ moieties of formula (B) of the silylated organo-modified compound described herein are each a moiety that produces a silanol group by reacting with water, and this silanol group is dehydrated and condensed with an inorganic material, e.g., an inorganic substrate such as metal or glass, to form a chemical bond of the formula: ≡Si—OM (M: inorganic material).

The expression "resin" as used herein can comprise not only a cured polymer material, but can include polymer precursor materials, e.g., polyimide precursor. The resins herein include both organic and inorganic resins.

The expression "heterocyclic group" as used herein is understood to be a ring of atoms of at least two elements, one of which is carbon, and the other of which is a heteroatom, e.g., N, O, and S.

The expression "which is interactive with" as used herein refers to the ability of the organic moieties or the hydrogen atoms of the silylated organo-modified compound to chemically react with a substrate.

In an embodiment herein the silylated organo-modified compound comprising the A and B moieties described above is wherein the subscript a=1, and has a linear structure, and comprises the general formula (I):

(I)

wherein A and B are as defined above; and, each L is independently a divalent linking group having a linear, branched, or cyclic structure containing up to 300 carbon atoms, and containing therein groups selected from the group consisting of alkyl, preferably linear or branched alkyl of up to 20 carbon atoms, more preferably from 1 to 8 carbon atoms and most preferably from 1 to 4 carbon atoms, alkenylene of from 2 to 20 carbon atoms, preferably from 2 to 8 carbon atoms, more preferably from 2 to 4 carbon atoms, alkylene, preferably linear or branched alkylene of from 1 to 20 carbon atoms, more preferably from 1 to 8 carbon atoms and most preferably from 1 to 4 carbon atoms, cycloalkylene, preferably cycloalkylene of from 5 to about 50 carbon atoms, more preferably from 5 to 18 carbon atoms, and even more preferably from about 6 to about 12 carbon atoms, such as the non-limiting examples of cyclopentylene and cyclohexylene, arylene, preferably arylene of from 5 to about 50 carbon atoms, more preferably from about 5 to about 12 carbon atoms, and even more preferably from about 6 to about 10 carbon atoms, such as the non-limiting example of phenylene, ether, preferably ether from 1 to 20 carbon atoms, more preferably ether from 1 to 4 carbon atoms, ester, preferably ester of from 1 to 20 carbon atoms, more preferably from 1 to 4 carbon atoms, urethane, preferably urethane from 2 to 20 carbon atoms, more preferably from 2 to 6 carbon atoms, urea, ureido, carbonate, imide, amide, phenyl, phenylene ether, epoxy, and cellulose each of up to 20 carbon atoms, and silicone, hydroxyl, amine, sulfone, sulfur, halogens, and combinations thereof, and the subscript n is an integer of from 1 to 1,000, preferably from 1 to 500, more preferably from 1 to 100.

In one embodiment, the silylated organo-modified compound of formula (I) is wherein each L is a divalent linear or branched structure containing one or more groups selected from the group consisting of alkylene of from 1 to about 20 carbon atoms, cycloalkylene of from 5 to about 18 carbon atoms, arylene of from 5 to about 18 carbon atoms, and ureido.

In one embodiment, the silylated organo-modified compound of general formula (I), has the formula:

wherein L is a divalent linear or branched alkylene group of from 1 to about 20 carbon atoms, more preferably from 1 to about 4 carbon atoms, and $R^1$ is a straight chain alkyl of from 1 to about 4 carbon atoms, preferably methyl or ethyl.

In another embodiment, the silylated organo-modified compound of general formula (I) has the formula:

wherein each R is independently a divalent linear or branched alkylene group of from 1 to about 20 carbon atoms, more preferably from 1 to about 4 carbon atoms, $R^{Ar}$ is a divalent arylene group of from 5 to about 50 carbon atoms, more preferably from 6 to about 10 carbon atoms, and each $R^1$ is independently a straight chain alkyl of from 1 to about 4 carbon atoms, preferably methyl or ethyl.

In another embodiment the silylated organo-modified compound of general formula (I) has the formula:

wherein each $R^1$ and $R^5$ are independently a straight chain alkyl of from 1 to about 4 carbon atoms, preferably methyl or ethyl, and the subscript n is an integer of from 1 to about 1,000, preferably from 1 to about 500, and more preferably from 1 to about 250.

In yet another embodiment the silylated organo-modified compound of general formula (I) has the formula:

wherein each $R^1$ and $R^5$ are independently a straight chain alkyl of from 1 to about 4 carbon atoms, preferably methyl and ethyl, and optionally, wherein one or more $R^5$ moieties are H, and the subscript n is an integer of from 1 to about 1,000, preferably from 1 to about 500, and more preferably from 1 to about 250.

In an embodiment herein the silylated organo-modified compound comprising the A and B moieties described above is wherein the subscript a=1, and has a branched structure, and comprises the general formula (II):

(II)

wherein A and B are as defined; each L is independently a divalent linking group having a linear, branched, or cyclic structure containing up to 300 carbon atoms, and containing therein groups as described above for formula (I); and, C is an unsubstituted or substituted, linear, branched or cyclic organic group having up to about 10,000 carbon atoms, preferably up to about 18 carbon atoms, more preferably up to about 12 carbon atoms, wherein the lower end point for linear organic groups is 1 carbon atom and the lower end point of branched organic groups is 4 carbon atoms, and the lower end point for cyclic organic groups is about 5 or 6 carbon atoms.

In one embodiment, the silylated organo-modified compound of formula (II) is wherein each L is a divalent linear or branched structure containing one or more groups selected from the group consisting of alkylene of from 1 to about 20 carbon atoms, preferably from 1 to about 8 carbon atoms and more preferably from 1 to 4 carbon atoms, cycloalkylene of from 5 to about 50 carbon atoms, preferably from 5 to 18 carbon atoms, and more preferably from about 6 to about 12 carbon atoms, arylene of from 5 to about 50 carbon atoms, preferably from about 5 to about 18 carbon atoms, more preferably from about 6 to about 12 carbon atoms, and ureido; and C is a trivalent organic moiety, preferably a trivalent alkyl of from 3 to about 30 carbon atoms, preferably from 3 to about 12 carbon atoms, aryl, preferably aryl of from about 6 to about 12 carbon atoms, aralkyl, preferably aralkyl of from 6 to about 30 carbon atoms, more preferably from about 7 to about 20 carbon atoms, alkaryl of from about 6 to about 30 carbon atoms, preferably from about 7 to about 20 carbon atoms.

In an embodiment, the silylated organo-modified compound of formula (II) is of the formula:

wherein each $R^1$ is independently a straight chain alkyl of from 1 to about 4 carbon atoms and each L is independently a linear, branched or cyclic alkylene of from 1 to about 20 carbon atoms.

In an embodiment herein the silylated organo-modified compound comprising the A and B moieties described above is wherein the subscript a=2, and comprises the general formula (III):

(III)

wherein A and B are as defined; and, each L is independently a divalent linking group having a linear, branched or cyclic structure containing up to 300 carbon atoms, and containing therein groups as described above for formulae (I) and (II).

In an embodiment, the silylated organo-modified compound of formula (II) is wherein each L is a divalent linear or branched structure containing one or more groups selected from the group consisting of alkylene of from 1 to about 8 carbon atoms, cycloalkylene of from 5 to about 18 carbon atoms, arylene of from 5 to about 18 carbon atoms, and ureido.

In one specific embodiment, the silylated organo-modified compound of formula (III) has the formula:

wherein each $R^1$ is independently a straight chain alkyl of from 1 to about 4 carbon atoms and each L is independently a linear or branched alkylene of from 1 to about 60 carbon atoms. The silylated organo-modified compound comprising the A and B moieties described above can be made by any process, but in a preferable, non-limiting embodiment, the process comprises reacting isocyanato organosilane with at least one of 2,4-diamino hydroxypyrimidine and 2,4,5-triamino-6-hydroxypyrimidine.

The isocyanato organosilane can be any known and/or commercially available isocyanato organosilane, and preferably, the isocyanato organosilane is of the general formula:

wherein L is a divalent linking group having a linear or branched structure, and containing therein groups as described above for formulae (I)-(III), preferably wherein L is a linear alkylene group of from 1 to about 20 carbon atoms, preferably about 3 carbon atoms, or alternatively wherein L is an organic group containing divalent alkylene moieties as noted in conjunction with, divalent ureido moiety, and divalent arylene or cycloalkylene moiety, and in both cases, each $R^1$ being independently a straight chain alkyl of from 1 to about 8 carbon atoms, preferably methyl or ethyl.

In an embodiment, the process described above can be conducted in a molar excess of isocyanato organosilane, preferably in a molar ratio of about 1.8:1 to about 2.2:1 of isocyanato organosilane to 2,4-diamino-6-hydroxypyrimidine, more preferably in a molar ratio of about 2:1, to produce the silylated organo-modified compound of formula (I). More specifically, when the process comprises reacting the isocyanato organosilane with 2,4,5-triamino-6-hydroxypyrimidine in a molar ratio of about 2.8:1 to about 3.2:1, preferably about 2.9:1 to about 3.1:1, more preferable in a molar ratio of 3:1, the resultant product is formula (III).

In an alternate embodiment the silylated organomodified compound herein can be made by a process comprising reacting a diisocyanato molecule with at least one of 2,4-diamino-6-hydroxypyrimidine or 2,4,5-triamino-6-hydroxypyrimidine, wherein the diisocyanato molecule is added in molar excess, and reacting the resultant product with amine-functionalized silane to produce the silylated organo-modified compound.

While any diisocyanate molecule may be used, preferably the diisocyanate is selected from the non-limiting group consisting of diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methyl-phenyl-2,4-phenyl diisocyanate, 4,4'-diphenyl-methane diisocyanate, 2,4'-diphenyl-methane diisocyanate, 4,4'-biphenylene diisocyanate, 3,3'-dimethoxy-4,4'-biphenylene diisocyanate and 3,3'-dimethyl-diphenyl-propane-4,4'-diisocyanate.

While any amine-functionalized silane may be used, preferably the amine-functionalized silane is of the general formula (AS):

wherein $R^1$ and $R^2$ are as defined herein, $R^6$ is a linear, branched or cyclic divalent moiety of from 1 to about 12 carbon atoms, preferably from about 2 to about 8 carbon atoms, more preferably from about 3 to about 6 carbon atoms, and $R^7$ is $R^2$ or H.

Some suitable non-limiting examples of aminosilanes of the formula (AS) are 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane, N-phenyl-3-aminopropyltrimethoxysilane and aminoisopropoxyethyltriethoxysilane.

In another embodiment of the process described herein, the isocyanato organosilane and 2,4-diamino-6-hydroxypyrimidine are reacted in about molar equivalent amounts, for example in a molar ratio of about 0.8:1 to about 1.2:1, preferably in a molar ratio of about 1:1, and the resulting product is then reacted with a tri-isocyanate, e.g., triphenylmethane-4,4',4"-triisocyanate in about molar ratio of about 3:1, as noted above, to produce the silylated organo-modified compound, e.g. the compound of formula (II) described herein.

In another embodiment of the process, isophorone diisocyanate and 2,4-diamino-6-hydroxypyrimidine are reacted at about molar equivalent amounts, with slightly more 2,4-diamino-6-hydroxypyrimidine, and the resulting product is then reacted with the isocyanato organosilane, and the end product is the silylated organo-modified compound having the formula:

wherein $R^1$ and $R^5$ are as defined above. Alternatively, this process can also be conducted with 2,4,5-triamino-6-hydroxypyrimidine. In some embodiments, the silylated organo-modified compound described herein can be used in flexible copper clad laminate.

In an embodiment herein, the silylated organo-modified compound can be present in a resin composition in varying amounts based upon the choice of resin, and/or based upon the application of the resin composition, and will be determined by one of ordinary skill in the art. However, in an embodiment, the amount of silylated organo-modified compound can be from about 0.01 to about 40 parts by mass relative to 100 parts of the resin, and more preferably from about 0.5 to about 10 parts by mass relative to 100 parts by mass of the resin. In another embodiment herein, the resin composition can include one or more of the silylated organo-modified compounds described herein, i.e., a mixture of two or more silylated organo-modified compounds.

The resin as described herein can be any polymer or polymer precursor listed below, which contains moieties capable of chemical reaction with the silylated organo-modified compound described herein.

In an embodiment herein the resin is selected from the group consisting of polyimide, polyetherimide, polyethylene terephthalate, glycol-modified polyethylene terephthalate, polybutylene terephthalate, and mixtures thereof.

In one embodiment, the resin is selected from the group consisting of polyimide, polyetherimide, thereof, and most preferably is polyimide, e.g., conventional polyimide, or colorless polyimide.

The amount of the resin that is employed in the resin composition will depend on the specific polymer and intended application of the resin composition and can be determined by a person of ordinary skill in the art. However, in a non-limiting embodiment, the amount of resin can be from about 10 weight percent to about 99.99 weight percent, or in another embodiment from about 15 weight percent to about 99.99 weight percent, preferably from about 50 weight percent to 99 weight percent, more preferably from about 80 weight percent to about 99 weight percent, and most preferably from about 90 weight percent to about 99 weight percent, said weight percent being based on the total weight of the resin composition.

In another non-limiting embodiment, the resin is a polyimide, and the resin composition herein is made by mixing a polyimide precursor solution, which is made by reacting diamine monomers with dianhydride monomers in NMP solvent overnight, with the silylated organo-modified compound, stirring for several hours (normally 2 to 12 hours). However, this process is not limited to polyimide as the resin, and the process can be modified accordingly to accommodate any of the resins described herein as will be understood by those skilled in the art. In an embodiment, the resin composition described herein can be made by contacting, e.g., mixing, the silylated organo-modified compound and resin as described herein.

The resin composition of the present invention may contain any other additive in addition to the above-mentioned composition components of silylated organo-modified compound and resin, provided they are used within a range of amounts which do not detract from the advantageous effects of the present invention, and such ranges of amounts will be appreciated by those skilled in the art. For example, the composition may contain any one or more of an antioxidant, a light stabilizer, a surfactant, a flame retardant, a plasticizer, a UV absorbent, any other polymer compound other than the above-mentioned organic resin, a curing agent, curing accelerator, an inorganic filler, a solvent, an antioxidant, a pigment, a dye and the like.

The resin composition described herein can be employed to make an article therefrom, e.g., wherein the article is selected from the group consisting of a resin film, a resin film with copper foil, a laminate, e.g., a flexible copper clad laminate, a prepreg, a printed circuit board, and a flexible electronic device. In an embodiment, the laminate comprises a substrate selected from the group consisting of plastic film, silicon wafer, ceramic, organic material, metal e.g., copper foil, and glass. In an embodiment, the laminate is a flexible copper clad laminate. The flexible electronic device can be a flexible display, which can be in part or in whole used to make up a foldable or rollable smartphone.

In another embodiment there is provided a resin film made into a film from the resin composition of the present invention. The resin film of the present invention is obtained by processing the resin composition into a film as is known by those skilled in the art.

The resin film of the present invention may be one in which a protective film is laminated on the resin film obtained from the resin composition. In one non-limiting example of a method for producing the resin film of the present invention, the silylated organo-modified compound and the resin, and other components are mixed to prepare a resin composition solution, the resin composition solution is applied on a protective film so as to be a desired thickness with a reverse roll coater or a comma coater. The protective film applied with the resin composition solution is passed through an inline dryer to remove an organic solvent at from about 80 to about 160° C. for about 2 to about 20 minutes to dry, followed by compressing and laminating with a separate protective film using a roll laminator to be able to obtain a laminate film in which a resin film is formed.

When the resin composition of the present invention is formed into a film shape, there is no restriction on the thickness but the thickness is preferably about 2 mm or smaller, more preferably about 50 μm or thicker and about 1,200 μm or thinner, and further preferably about 80 to about 850 μm.

The protective film is not particularly restricted as long as it can be peeled without damaging a shape of the resin film made of the resin composition, but functions as a protective film and a peel film for a wafer, and usually plastic films such as a polyethylene (PE) film, a polypropylene (PP) film, a polymethylpentene (TPX) film, and a polyester film provided with a mold release treatment are used. Furthermore, the peeling force is preferably from about 50 to about 300 mN/min. A thickness of the protective film is preferably from about 25 to about 150 μm, and more preferably from about 38 to about 125 μm.

A laminate of the present invention has a cured product of the resin film of the present invention on a substrate. In an embodiment, a non-limiting method for producing the laminate of the present invention is a method having a step of adhering the resin film on a substrate to mold the substrate, and a step of heating and curing the resin film on the substrate. In another non-limiting embodiment, the laminate is a polyimide metal clad laminate which includes a dielectric layer of polyimide and at least a conductive layer of metal foil, e.g., copper foil. The layers are bonded with or without adhesives.

A polyimide copper clad laminate can in one embodiment herein be a flexible copper clad laminate (FCCL).

There is also provided herein a process for manufacturing a laminate, preferably a copper clad laminate, more preferably a flexible copper clad laminate. First, a silylated organo-modified compound and a resin, e.g., a polyimide precursor, and other optional components are mixed to prepare a resin composition, the resin composition solution is applied on a copper foil substrate. Then, the resin composition is cast onto a metal substrate and baked, in batch or continuously, at high temperature to cure the resin so as to obtain the copper clad laminate. Generally, the baking is at a temperature from about 200° C. to about 450° C. The copper foil is chosen so that the surface roughness of the foil has minimal impact on the clarity (minimal light scattering due to surface topography) of the resin (ii). Normally, the selected copper foil has a surface roughness of about 0.7 µm or less and such copper foil is referred to as "smooth copper foil."

In another embodiment, there is provided a process of manufacturing a flexible display comprising the resin composition described herein. In an embodiment, the method includes coating the resin composition onto a glass substrate; and, curing the resin composition to form a resin layer on the glass substrate. Examples of the electronic device according to embodiments of the present disclosure which may include the flexible display include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device.

EXAMPLES

The silylated organomodified compound herein is made by reacting any of the components in column X with any of the components in the column Y recited in the following table 1:

TABLE 1

| X | Y |
|---|---|
| 3-isocyanatopropyltrimethoxysilane | 2,4-diamino-6-hydroxypyrimidine |
| 3-isocyanatopropyltriethoxysilane | 2,4,5-triamino-6-hydroxypyrimidine |
| 3-isocyanatopropyldimethoxyethoxysilane | 2,3,4-triamino-6-hydroxypyrimidine |
| 3-isocyanatoethyltrimethoxysilane | 2,5-diamino-6-hydroxypyrimidine |
| 2-isocyanatoisopropyltrimethoxysilane | 2,3-diamino-6-hydroxypyrimidine |
| 1-ureidobenzylisocyanato-3-propyltrimethoxysilane | |
| 1-ureidotolylisocyanato-3-propyltrimethoxysilane | |
| 1-ureidocyclohexyl lisocyanato-3-propyltrimethoxysilane | |
| 1-ureido-1-methylcyclohexylisocyanato-3-propyltrimethoxysilane | |

The product of the reaction of components X and Y above can subsequently be reacted with compounds such as tri-isocyanato triphenyl methane, di-isocyanato triphenyl methane, and mono-isocyanato triphenyl methane, and 1, 3, 5-triisocyanato benzene.

EXPERIMENTAL EXAMPLES

Example 1

Figure 1:
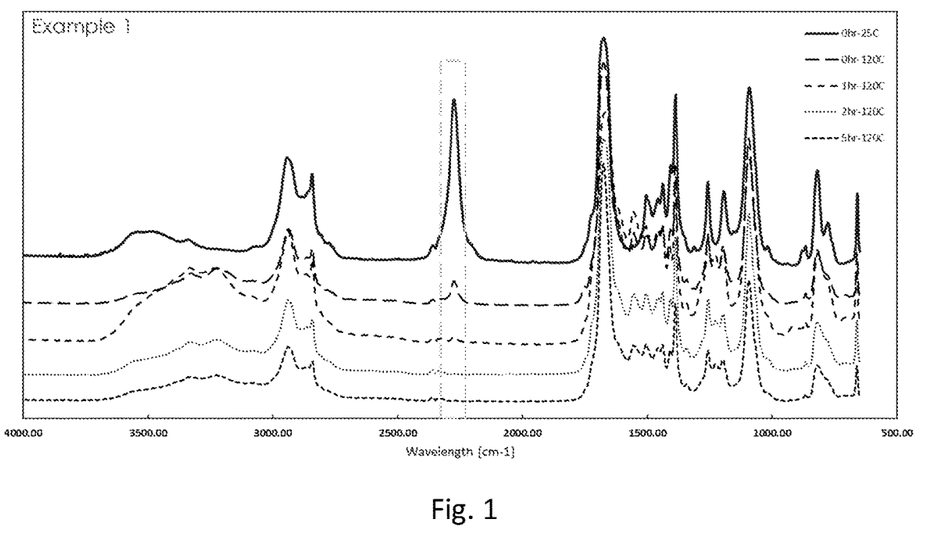
FIG. 1 is a Fourier Transform Infrared Spectroscopy (FTIR) analysis of the reaction progress of Example 1.

50.4 g of 2,4-Diamino-6-hydroxypyrimidine, 164 g of Isocyanatopropyltrimethoxysilane, at molar ratio of 1:2, and 300 ml of DMF were charged into a 1 L reactor under stirring. The mixture was purged thoroughly with nitrogen for 10 mins. The mixture was then heated to and kept at 120 C for the reaction to complete. Reaction progress was monitored with FTIR by measuring intensity of isocyanate peak near 2270 cm$^1$. As FTIR result show (FIG. 1), the isocyanate peak disappeared after 2 hr, which indicates the reaction has completed.

After DMF solvent removal, the resulting material appears as brownish solid.

Example 2

Figure 2:
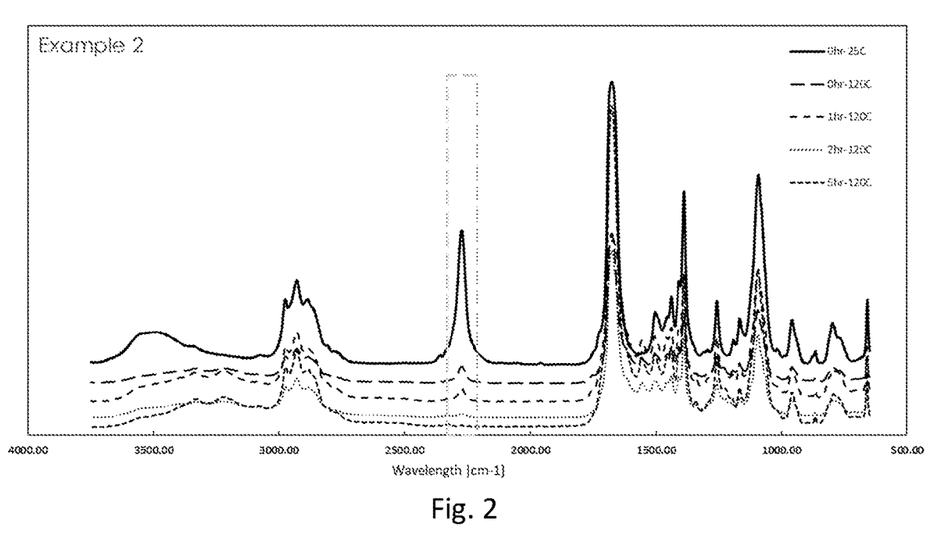
FIG. 2 is a Fourier Transform Infrared Spectroscopy (FTIR) analysis of the reaction progress of Example 2.

50.4 g of 2,4-Diamino-6-hydroxypyrimidine, 197.6 g of Isocyanatopropyltriethoxysilane, molar ratio of 1:2, and 300 ml of DMF were charged into a 1 L reactor under stirring. The mixture was purged thoroughly with nitrogen for 10 mins. The mixture was then heated to and kept at 120 C for the reaction to complete. Reaction progress was monitored with FTIR by measuring intensity of isocyanate peak near 2270 cm$^{-1}$. As FTIR result show (FIG. 2), the isocyanate peak disappeared after 5 hr, which indicates the reaction has completed.

After DMF solvent removal, the resulting material appears as brownish high viscous liquid, with a viscosity around $1 \times 10^8$ mPa s measured at 30° C. and shear rate of 0.04/s."

Example 3

Figure 3:
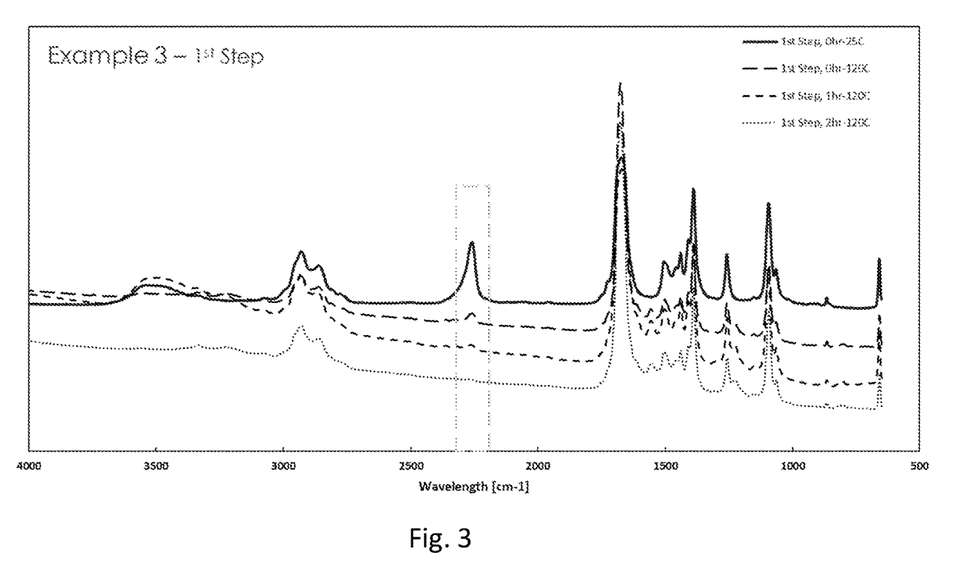
FIG. 3 is a Fourier Transform Infrared Spectroscopy (FTIR) analysis of the reaction progress of the first step of Example 3.

Step 1: 7.56 g of 2,4-Diamino-6-hydroxypyrimidine, 11.1 g of Isophorone Diisocyanate, molar ratio of 6:5, and 100 ml of DMF were charged into a 1 L reactor under stirring. The mixture was then heated to and kept at 120 C for the reaction to complete. Reaction progress was monitored with FTIR by measuring intensity of isocyanate peak near 2270 cm$^{-1}$. As FTIR results show (FIG. 3), the isocyanate peak disappeared after 2 hr at 120° C., which indicates the Step 1 reaction has completed.

Figure 4:
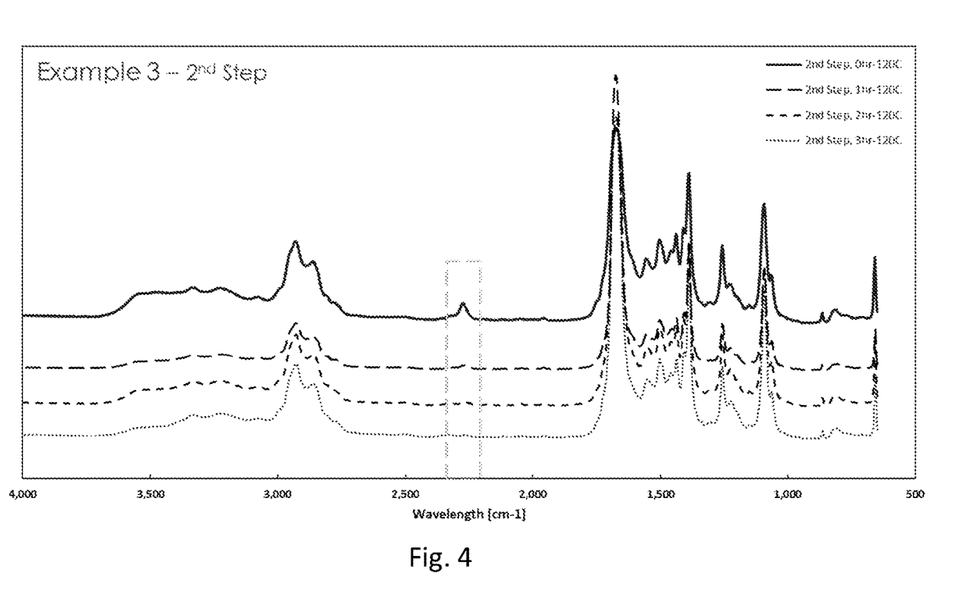
FIG. 4 is a Fourier Transform Infrared Spectroscopy (FTIR) analysis of the reaction progress of the second step of Example 3.

Step 2: 4.1 g of Isocyanatopropyltrimethoxysilane was added into the reaction solution of Step 1, under nitrogen. The reaction was then carried out at 120 C until it reached completion. Reaction progress was monitored with FTIR by measuring intensity of isocyanate peak near 2270 cm$^{-1}$. As the FTIR results show (FIG. 4), the isocyanate peak disappeared after 3 hr, which indicates Step 2 reaction has completed.

After DMF solvent removal, the resulting material appears as yellowish solid.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

What is claimed is:

1. A silylated organo-modified compound, having the formula:

wherein L is a divalent linear or branched alkylene group of from 1 to about 20 carbon atoms and $R^1$ is a straight chain alkyl of from 1 to about 4 carbon atoms.

2. A silylated organo-modified compound, having the formula:

wherein each $R^1$ and $R^5$ are independently a straight chain alkyl of from 1 to about 4 carbon atoms and the subscript n is an integer of from 1 to about 1,000.

3. A silylated organo-modified compound, having the formula:

wherein each $R^1$ and $R^5$ are independently a straight chain alkyl of from 1 to about 4 carbon atoms, and optionally wherein one or more $R^5$ moieties are H, and the subscript n is an integer of from 1 to about 1,000.

4. A silylated organo-modified compound having the formula:

wherein each $R^1$ is independently a straight chain alkyl of from 1 to about 4 carbon atoms and each L is independently a linear, branched or cyclic alkylene of from 1 to about 8 carbon atoms.

5. A silylated organo-modified compound having the formula:

wherein each $R^1$ is independently a straight chain alkyl of from 1 to about 4 carbon atoms and each L is independently a linear or branched alkylene of from 1 to about 60 carbon atoms.

6. A process of making the silylated organo-modified compound of claim 1, the process comprising:
reacting an isocyanato organosilane with at least one of 2,4-diamino-6-hydroxypyrimidine or 2,4,5-triamino-6-hydroxypyrimidine.

7. A process of making the silylated organo-modified compound of claim 1, the process comprising:
reacting a diisocyanato molecule with at least one of 2,4-diamino-6-hydroxypyrimidine or 2,4,5-triamino-6-hydroxypyrimidine, wherein the diisocyanato molecule is added in molar excess, and reacting the resultant product with amine-functionalized silane to produce the silyated organo-modified compound.

8. A process of making the silylated organo-modified compound of claim 1, the process comprising reacting isophorone diisocyanate and 2,4-diamino-6-hydroxypyrimidine, wherein the 2,4-diamino-6-hydroxypyrimidine is added in a molar excess amount, and reacting the resultant product with an isocyanato organosilane to produce the silylated organo-modified compound.

9. The process of claim 6, wherein the isocyanato organosilane is of the general formula:

wherein L is a divalent linear or branched alkylene group of from 1 to about 20 carbon atoms and $R^1$ is a straight chain alkyl of from 1 to about 4 carbon atoms.

10. The process of claim 6, further comprising reacting the isocyanato organosilane and the 2,4-diamino-6-hydroxypyrimidine in about a molar equivalent amount, and wherein the resulting product is reacted with triphenylmethane-4,4',4"-triisocyanate in about molar ratio of about 3:1 to produce the silylated organo-modified compound.

11. The process of claim 6, further comprising reacting the isocyanato organosilane with 2,4,5-triamino-6-hydroxypyrimidine in a molar ratio of about 2.8:1 to about 3.2:1.

12. A resin composition comprising the silylated organo-modified compound of claim 1, and a resin selected from the group consisting of polyimide, colorless polyimide, polyetherimide, polyethylene terephthalate, glycol-modified polyethylene terephthalate, polybutylene terephthalate, and mixtures thereof.

13. A flexible copper clad laminate or a flexible display comprising the silylated organo-modified compound of claim 1.

14. A resin composition comprising the silylated organo-modified compound of claim 2, and a resin selected from the group consisting of polyimide, colorless polyimide, polyetherimide, polyethylene terephthalate, glycol-modified polyethylene terephthalate, polybutylene terephthalate, and mixtures thereof.

15. A flexible copper clad laminate or a flexible display comprising the silylated organo-modified compound of claim 2.

16. A resin composition comprising the silylated organo-modified compound of claim 3, and a resin selected from the group consisting of polyimide, colorless polyimide, polyetherimide, polyethylene terephthalate, glycol-modified polyethylene terephthalate, polybutylene terephthalate, and mixtures thereof.

17. A flexible copper clad laminate or a flexible display comprising the silylated organo-modified compound of claim 3.

18. A resin composition comprising the silylated organo-modified compound of claim 4, and a resin selected from the group consisting of polyimide, colorless polyimide, polyetherimide, polyethylene terephthalate, glycol-modified polyethylene terephthalate, polybutylene terephthalate, and mixtures thereof.

19. A flexible copper clad laminate or a flexible display comprising the silylated organo-modified compound of claim 4.

20. A resin composition comprising the silylated organo-modified compound of claim 5, and a resin selected from the group consisting of polyimide, colorless polyimide, polyetherimide, polyethylene terephthalate, glycol-modified polyethylene terephthalate, polybutylene terephthalate, and mixtures thereof.

21. A flexible copper clad laminate or a flexible display comprising the silylated organo-modified compound of claim 5.

* * * * *